United States Patent [19]

Fortmann et al.

[11] Patent Number: 5,421,481
[45] Date of Patent: Jun. 6, 1995

[54] SELF-BIASING SYSTEM

[75] Inventors: Robert Fortmann, Mundelein, Ill.;
Lawrence G. Banovez, Kenosha, Wis.

[73] Assignee: Carter-Hoffmann Corporation, Mundelein, Ill.

[21] Appl. No.: 99,615

[22] Filed: Jul. 30, 1993

[51] Int. Cl.⁶ .............................................. B65G 59/02
[52] U.S. Cl. ..................................... 221/271; 221/279; 108/136; 108/147; 312/42; 312/319.1; 312/319.4
[58] Field of Search ................... 221/279, 150 A, 243, 221/271; 108/136, 147; 312/42, 319.1, 319.4

[56] References Cited

U.S. PATENT DOCUMENTS

| 2,426,995 | 9/1947 | Gibbs | 221/279 X |
|---|---|---|---|
| 2,647,029 | 7/1953 | Deland | 221/279 X |
| 2,806,631 | 9/1957 | Van Vactor | 221/279 X |
| 3,082,876 | 3/1963 | Cranmore | 211/59.3 |
| 3,381,634 | 5/1968 | Rothschild | 108/136 |
| 3,481,448 | 12/1969 | Rothschild | 198/481.1 |
| 3,724,715 | 4/1973 | Auriemma | 221/279 X |
| 3,820,748 | 6/1974 | Bergenthal | 312/71 X |
| 4,438,676 | 3/1984 | Kausträter | 221/279 X |

FOREIGN PATENT DOCUMENTS 1357160  2/1964  France ................ 211/59.3 X

Primary Examiner—James R. Bidwell
Assistant Examiner—Dean A. Reichard
Attorney, Agent, or Firm—Wood, Phillips, VanSanten, Clark & Mortimer

[57] ABSTRACT

A self-biasing system for articles has an article support, a frame for controlling the movement of the support and a biasing structure capable of moving the support. The system can be a self-leveling article dispenser with the frame including elongate channel members. The channel members define an elongated cavity capable of receiving articles to be dispensed. A platform is slidably received in the cavity. A plate has one part of a reversibly extensible structure secured thereto. A flexible line has a segment secured to the platform and the linear movement thereof is controlled by a guide on the plate and a guide associated with the frame.

10 Claims, 2 Drawing Sheets

SELF-BIASING SYSTEM

TECHNICAL FIELD

This invention generally relates to self-biasing systems for articles. More particularly, the invention relates to indirectly self-leveling dispensers for stacked articles.

BACKGROUND OF THE INVENTION

Dispensers for a stack of articles typically have a frame that defines a cavity to receive the articles. A platform in the cavity supports the articles. The level of the top article in the stack is maintained by adjusting the level of the platform using a force to counter the weight of the article(s) on the platform. The counter force can be provided by springs either alone or in combination with pulleys. The counter force is varied so that the top article is at a desired height in the dispenser when the platform is at the adjusted level.. Therefore, these dispensers are self-leveling in that the dispenser is capable of maintaining the top article at the desired height when an article is added to, or removed from, the dispenser without an operator adjusting the level of the platform.

In operation, when an article is placed onto the platform or stack the extra weight temporarily overcomes the counter force and lowers the platform so the platform or top article is at the desired height. When an article is removed from the stack, the decrease in weight permits the counter force to raise the platform so that the top article is at the desired height.

Representative articles include dinnerware, trays, food containers and the like.

The dispensers are often used in the food industry, e.g., restaurants and hospitals. The dispenser can be located in a heated base to keep the articles warm or to ensure sterility of the articles. The dispenser may be heated to temperatures in excess of 300° F.

FIG. 1 illustrates a prior art square dispenser 10 having a frame 12 with an upper end 14 and a lower end 16. Posts 18 define the corners of the dispenser 10. A movable spring holder 20 slidably extends around the perimeter of the frame 12. Exposed springs 22 are secured to the lower end 16 and the spring holder 20. A platform 24 is slidably received within the interior of the frame 12. Pulleys 26 are located on the posts 18 near the upper end 14. A pulley 27 is located on the platform 24. A cable 28 extends from the spring holder 20 over the pulley 26, under the pulley 27, over a second pulley 26 and back to the holder 20. A second set of the pulleys 26, pulley 27 and cable 28 are present on the side of the dispenser 10 not being viewed.

The dispenser 10 has numerous shortcomings. The springs 22 are exposed to the interior of the frame 12. Thus, the articles (not shown) or the platform 24 can become entangled in the springs 22. If the springs 22 suddenly become untangled, the articles and platform 24 can quickly and unexpectedly rise, injuring the user. The exposed springs 22 can trap dirt and debris and then transfer this to clean articles or the platform 24. The presence of the dirt and debris would require recleaning of the articles and platform 24.

The prior art dispenser 10 has a number of other structural features that can also result in entangling or that can result in binding of the dispenser 10. Problems similar to those observed when untangling the springs arise when the user attempts to unbind the dispenser 10. The dispenser 10 has only two pulleys 27 on the platform 24. The leveling of the platform. 24 depends on pulleys 27. However, the platform 24 can rotate about an axis (not shown) through the pulleys 27. If the articles are unevenly loaded on the platform 24, the platform 24 can rotate and become tilted resulting in the articles or platform 24 becoming entangled in the springs 22. Alternatively, the article or platform 24 could become bound with the exposed posts 18. Also, the spring holder 20 extends around the perimeter of the frame 12. Uneven loading of the platform 24 can result in the spring holder 20 becoming bound with the posts 18.

The arrangement of the springs 22, spring holder 20, pulleys 26 and 27 and cable 28 requires that the frame 12 be rectangular in shape. Since the articles are typically round, there is an increase in likelihood of entangling or binding due to the differences in shape.

The configuration of the cable 28 and the size of the pulleys 26,27 cause excessive forces to be applied to the bearings (not shown) of the pulleys 26,27. The bearings are prone to failure due to these forces, especially at elevated temperatures. Failure of the bearings could result in the dispenser 10 being inoperable.

The force generated by the springs 22 is not increased by the arrangement of the pulleys 26,27. More or heavier springs 22 are required because there is no force increase. The use of more springs 22 increases the likelihood of tangling, binding and dirt and debris being trapped and transferred to the article. Heavier springs 22 are more expensive.

FIG. 2 illustrates a prior art round dispenser 30. A ring 32 has partially enclosed side supports 34 extending therefrom. Openings 36 are defined in the perimeter of the dispenser 30 between the supports 34. A cavity 38 within the dispenser 30 receives a platform 40 therein. A spring holder 42 is secured to the platform 40 and extends around the circumference of the dispenser 30. Springs 44 within the support 34 are secured to the ring 32 and to the spring holder 42. The springs 44 directly act upon the platform 40. The springs 44 are separated from the cavity 38 by the side 35 of the support 34.

The supports 34 must be large enough to contain the multiple springs 44 required to support and lift the platform 40 and articles (not shown) thereon. The size of the supports 34 significantly reduces the size of the openings 36. This reduction in the size significantly reduces the amount of air that can flow therethrough which increases the time period required to heat, cool or dry the articles within the dispenser 30.

The springs 44 are stretched 1 inch for every 1 inch the platform 40 is lowered. Thus, the springs 44 can be extended to their absolute maximum length when the platform 40 is at its lowest position within the dispenser 10. Stretching the springs 44 to their absolute maximum length can result in the springs 44 taking a set (a nonrecoverable deformation), especially at an elevated temperature. A spring 44 that takes a set will not contract to its original, fully contracted length but rather will only contract to a longer length. When a spring 44 loses its ability to contract to its original, fully contracted length, the force on the platform 40 can be uneven which results in entanglement or binding. The undesirability of a tangled or bound dispenser 10 is discussed above. Furthermore, when the spring 44 takes a set, the force on the platform 40 is lessened which can result in the platform 40 no longer being self-leveling which results in the top article (not shown) not being at the desired height.

The force generated by the springs 44 is applied to the platform 40 with no increase in force which requires more springs 44 than a structure wherein the force is increased. The use of more springs 44 increases the size of the supports 34 and decreases the size of the openings 36 which reduces air flow.

The cavity 38 has an overall length L1, a usable length L2 and an unusable length L3 when the platform 40 is at the bottom of the cavity 38. Thus, only a percentage of the length of the cavity 38 can be used to hold articles. The unusable length L3 is due to the springs 44 being fully contracted when the platform 42 is at the top of the cavity 38. Increasing the length of the cavity 38 requires that longer springs 44 be used which have a longer fully contracted length. The platform 42 will not be at the top of the cavity 38 because the longer springs 44 cannot be contracted any more. The thickness of the platform 42 must be increased so that it will be at the top of the cavity 38. Increasing the thickness of the platform 42 increases the unusable length L3 as the overall length L1 increases. Thus, the unusable length L3 is dependent upon the length of the fully contracted springs 44. Increasing the number of articles that can be held by increasing the overall length is impractical.

The length of the dispenser can be limited by the base which is designed to hold the dispenser therein. Therefore, it is not possible to increase the length of the dispenser to increase the number of articles that can be held therein. Furthermore, as the length of the dispenser increases, the more costly it is to obtain springs that do not take a set.

A dispenser that is self-leveling and which does not exhibit at least one of the aforementioned shortcomings is highly desirable.

SUMMARY OF THE INVENTION

A self-biasing system for articles is disclosed. Preferably, the biasing system is a self-leveling dispenser capable of dispensing articles. The system has an article support, a frame having a means for controlling the movement of the support along a predetermined path and a means for biasing the support along the controlling means. The path has a path length. The biasing means moves the support a distance that is different than the change in length of the biasing means. Preferably, the distance is greater than the change in length and the biasing means does not have to be stretched to its absolute maximum length.

The system can also include a means for increasing the predetermined force generated by the biasing means. By increasing the force, fewer biasing means are required as compared to a system that does not increase the force or uses a biasing means having a greater predetermined force.

The system has an overall length, a usable length that can receive articles and an unusable length that cannot receive articles. The biasing means has a fully contracted length. The unusable length is independent of the fully contracted length.

The self-biasing system will be discussed hereinafter in terms of a dispenser; it being understood that the system is not limited thereto.

The frame of the dispenser includes elongate channel members that define an elongate cavity. A platform within the cavity functions as a support and has the movement thereof controlled by the frame. A reversibly extensible structure is a biasing means and has a part that is secured to a plate. The plate moves along at least a portion of the length of the cavity. A flexible line has a segment that is secured to the platform and indirectly transfers the force generated by the extensible member to the platform. The linear movement of the line is controlled by a pulley on the plate and a stationary pulley associated with the frame.

Preferably, the extensible structure nests within a channel member with a side of the channel member facing the cavity. This structure permits the extensible structure to be shielded from the article within the cavity. Shielding results in a reduction in the possibility of the extensible structure binding with the article or platform. Shielding also reduces the possibility that dirt or debris from the extensible structure will soil the platform or article. Preferably, the channel member is only capable of holding one extensible structure.

The structure of this dispenser results in the extensible structure extending or contracting about $\frac{1}{2}$ inch for about every 1 inch the platform travels. Thus, less stress is placed on the extensible structure because it does not have to be extended to its absolute maximum length when the platform is at the bottom of the cavity. The likelihood of the extensible structure taking a set is thereby reduced, which is especially beneficial at elevated temperatures where the likelihood of set occurring usually increases. Extensible structures are more readily available because they do not have to stretch the entire distance that the platform travels.

The force of the extensible structures is increased which results in a reduction in the number of extensible structures and channel members required to shield the extensible structures from the cavity. These reductions result in an increase in the open space about the perimeter of the dispenser. The increase in open space results in an increase in airflow between the cavity and the exterior of the dispenser which increases the rate at which an article contained in the dispenser is heated, cooled, dried, etc.

The structure permits an increase in the percentage of the length of the dispenser that is usable to hold articles. The dispenser can be used in an existing base and hold more articles than prior art dispensers. The unusable length of the dispenser remains constant when the dispenser length is increased because the unusable length is independent of the fully contracted length of the extensible structures. Thus, if the dispenser length is increased to increase the number of articles that can be held, none of the increased length is unusable.

The plate does not extend around the perimeter of the dispenser. Thus, the plate is not prone to binding.

Preferably, the platform is supported using three flexible lines spaced about its perimeter with each flexible line being secured to a different plate. This structure permits an even leveling of the platform which reduces the likelihood of binding. The structure also limits the wear on the pulleys because there are more than two points of attachment to the platform.

The cavity can have a round or rectangular cross-section to match the shape of the article to be contained therein. The flexibility to make a cavity having a round or rectangular cross-sectional area is obtained by the structure of the dispenser.

DETAILED DESCRIPTION OF THE PREFERRED EMBODIMENTS

Figure 3:
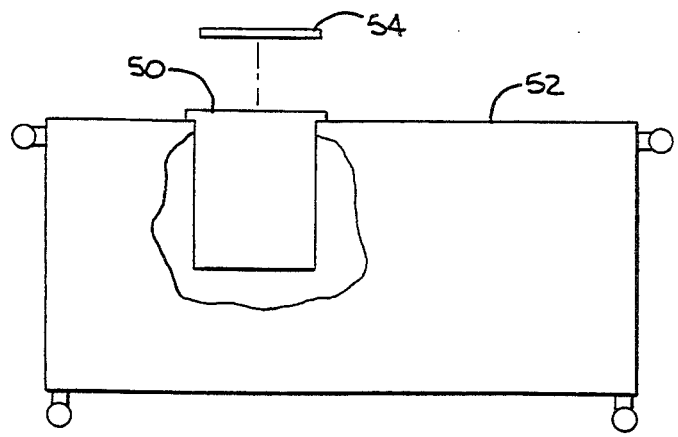
FIG. 3 is a schematic, side elevational view of the inventive dispenser incorporated into a mobile base, which is partially broken away to show the dispenser.

FIG. 3 schematically illustrates a self-biasing system according to the invention, in the form of a self-leveling dispenser 50. The dispenser 50 is within a base 52. The base 52 can be stationary or portable and can be heated, unheated, cooled, etc. Article 54 can be within the dispenser 50.

The articles can be those articles typically used in the food service industry, e.g., dinnerware (for example dishes and bowls), heatable and heat retaining containers to keep food warm, food covers and the like. A typical application of the dispenser 50 is to reposition the articles for dispensing.

Figure 4:
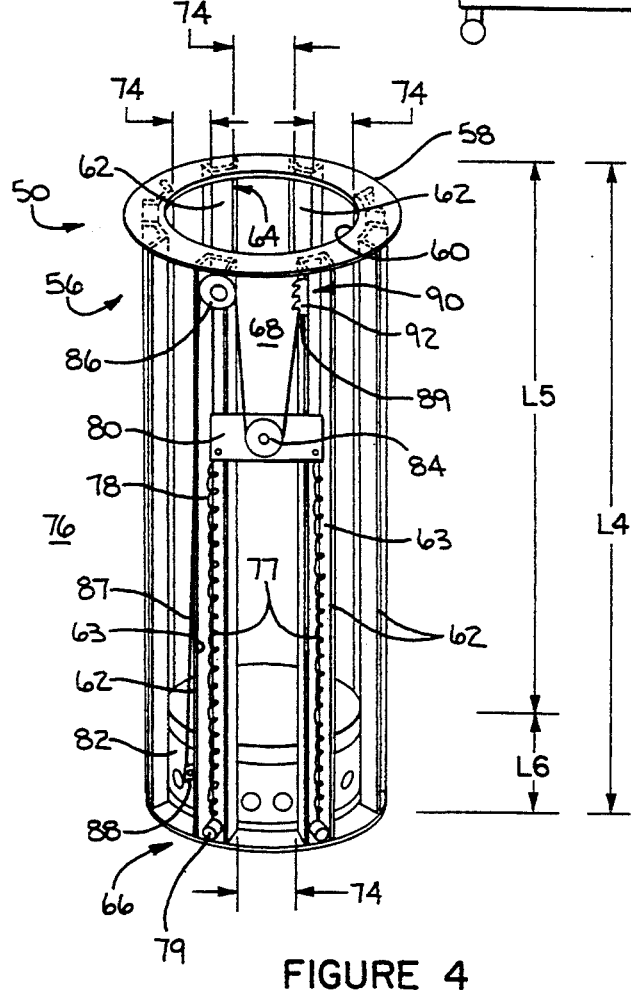
FIG. 4 is an isolated perspective view of the inventive dispenser.

As shown in FIG. 4, the dispenser 50 has a cylindrical frame 56 that includes a collar 58 and elongate channel members 62 extending from the collar 58. The channel members 62 are generally U-shaped and open radially outwardly of the frame 56. An opening 60 is defined by the collar 58. The channel members 62 each have an upper end 64, which is attached to the collar 58, and a lower end 66. The collar 58 and the elongate channel members 62 define a vertical elongate cavity 68 that can receive article(s) to be dispensed. Although the cavity 68 is shown having a round cross-section in a plane parallel to the collar 58, it can have any cross-sectional shape. It should be understood that the dispenser can be have an orientation other than vertical, e.g., the dispenser can be horizontally disposed. A gap 74 is defined between adjacent channel members 62. The channel members 62 also define a frame exterior 76.

A reversibly extensible structure 77, preferably in the form of a coil spring, exerts a predetermined force and preferably nests in a space 63 defined in each of the elongate channel members 62. The extensible structure 77 has a first part 78 and a second part 79. The first part 78 is preferably secured to a moveable plate 80. The second part 79 is secured, preferably to the lower end 66 of the channel member in which the extensible structure 77 nests. The first and second parts 78 and 79 can be the ends of the extensible structure 77.

A platform 82 supports the article and is slidably received within the cavity 68. The platform 82 is shown at the bottom of the dispenser 50. The cavity 68 controls the movement of the platform 82 along a predetermined path having a path length. Although the path is illustrated to be a straight path, the path can have another shape, for example a curved shape. The reversible extensible structure 77 extends and contracts to change its length with the change in length being different than the distance that the platform 82 travels for a given extension and contraction. Preferably, the change in length is less than the distance the platform travels.

A flexible line 87 has a first segment 88 secured to the platform 82 and a second segment 89. The linear movement of the flexible line 87 is guided by guide means 84 and 86 on the plate 80 and the frame 56, respectively. The movement of the plate 80 causes the platform 82 to also move. The guide means 84,86 can be posts but preferably are pulleys. The guide means 86 on the frame 56 is preferably adjacent to the collar 58 or upper end 64. The guide means 84,86 guide the flexible line 87 in a Z-shaped pattern. The predetermined force of the extensible structure 77 is increased by the arrangement of the guide means 84, 86 and flexible line 87. The first and second segments 88 and 89 can be ends of the flexible line 87.

Preferably, the second segment 89 of the flexible line 87 is secured to a tension adjustor 90. The tension adjustor 90 has a number of securement points 92. By selecting one of the securement points 92, the tension on the flexible line 87 is selected which adjusts the tension on the flexible line 87. The force exerted on the platform 82 is thereby adjusted which results in the distance the platform 82 travels when an article is placed thereon, or removed therefrom, to be adjusted. Thus, the dispenser 50 can be used with articles of varying weight.

Preferably, the extendible structure 77 is within the channel member 62. Alternatively, the extendible structure 77 is not within a channel member 62. This alternative is not illustrated.

Figure 5:
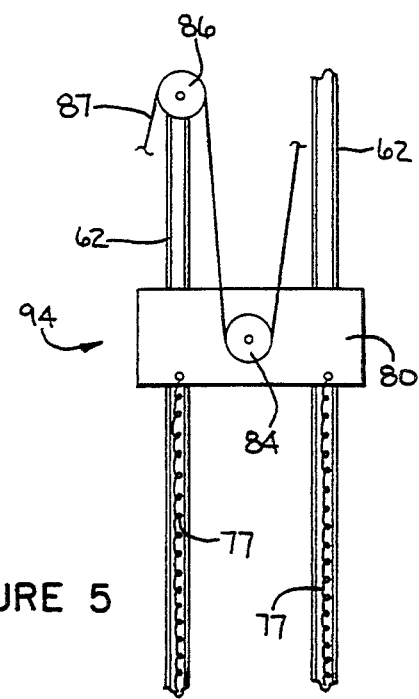
FIG. 5 is an isolated, side elevational view of a level controller of the inventive dispenser.

Preferably, the dispenser 50 has at least three level controllers 94 (FIG. 5), each of which includes a pair of the elongate channel members 62, the extensible structure 77 within each channel member 62, the plate 80 extending between the two channel members 62, the plate pulley 84, the frame pulley 86 and the flexible line 87.

The channel members 62 can be C-shaped or U-shaped with U-shaped channel members being preferred.

The reversibly extensible structure 77 is capable of withstanding the conditions, e.g., temperature, humidity and the like, to which the dispenser 50 is exposed and is durable. Representative extensible structures 77 include springs and elastic cords.

The dispenser 50 can be designed so that the cavity 68 has a shape similar to the article being dispensed. This minimizes the likelihood of the dispenser 50 becoming bound.

In operation, an article 54 is loaded onto the platform 82, the weight of article 54 is transmitted by the flexible line 87 to the plate 80 which moves the plate 80 upward toward the collar 58. Movement of the plate 80, and hence the platform 82, is limited by the extensible structures 77 secured to the plate 80. When the force exerted on the platform 82 due to the weight of the article 54 equals the force exerted on the platform 82 due to the extensible structures 77, the platform 82 reaches an equilibrium point with the article 54 being at a desired level.

Due to the structure, the extensible structures 77 only extend half the distance the platform 82 travels, i.e., for about every 1 inch the platform 82 is lowered the extensible structures 77 only extend a about $\frac{1}{2}$ inch. Thus, less stress is placed on the extensible structures 77 because they do not have to be extended to their absolute maximum length when the platform 82 is at the bottom of the cavity 68. The likelihood of the extensible structures 77 taking a set is thereby reduced which is especially beneficial at elevated temperatures where the likelihood of set occurring usually increases.

When the article 54 is removed from the dispenser 50, the weight on the platform 82 is lessened. The extensible members 77, which only contract about $\frac{1}{2}$ the distance the platform 82 travels, pulling down on the plates 80 cause the platform 82 to rise until the force exerted by any remaining articles 54 on the platform 82 and the force exerted on the platform 82 by the extensible structures 77 have equalized. The article 54 is then at the desired height.

The cavity 68 has an overall length L4 and a usable length L5. The difference between the overall length L4 and the usable length L5 is the unusable length L6. The unusable length L6 is constant regardless of the overall length LA and is not dependent upon the fully contracted length of the extensible structure 77. That is, a heavier extensible structure 77 which in its fully contracted state would require an increase in unusable length L6, is not utilized. Thus, the overall length LA can be increased to increase the usable length L5 to receive a greater number of articles without increasing the unusable length L6.

Figure 1:
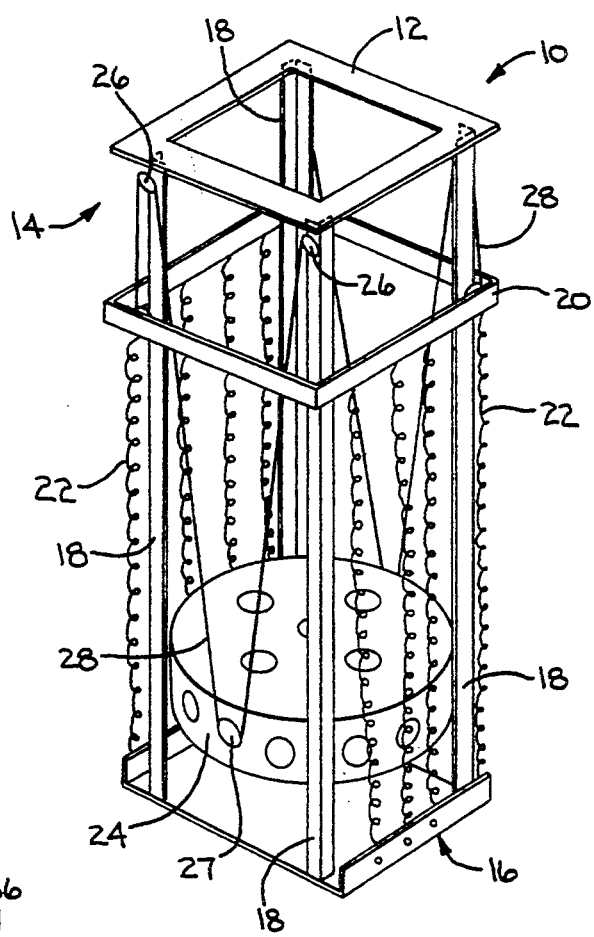
FIG. 1 is a perspective view of one type of prior art dispenser.
Figure 2:
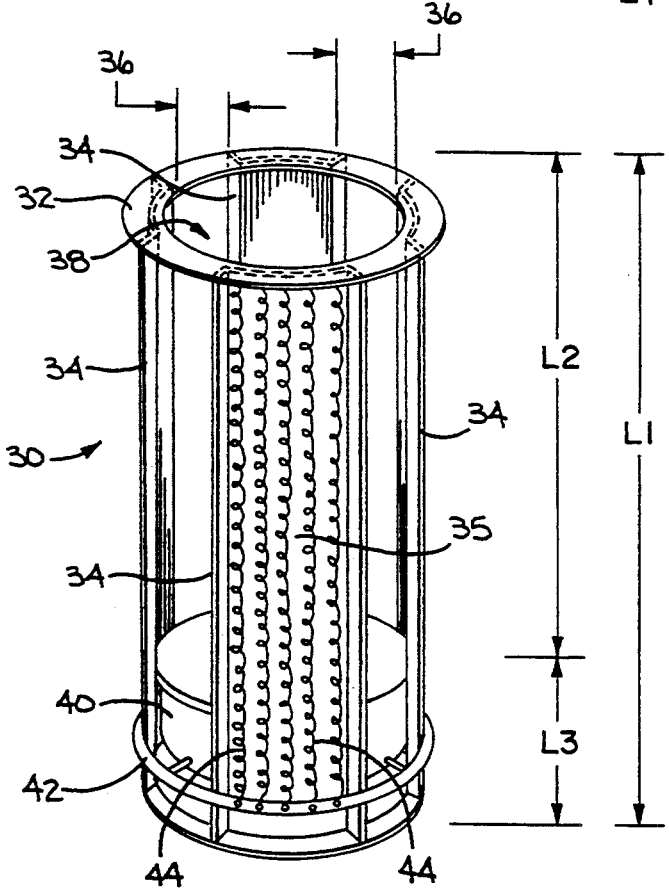
FIG. 2 is a perspective view of another type of prior art dispenser.

The increase in the predetermined force of the extensible structure 77 enables fewer extensible structures 77 to be utilized which minimizes the number of channel members 62 required to receive the extensible structures 77. The minimization of the number of channel members 62 maximizes the size of the gap 74 between channel members 62. Thus, the total area of the gaps 74 is maximized. Dispensers 50 have been built wherein the channel members 62 cover only 12.5% of the surface area of the frame 56 defined by the channel members 62 with the gaps 74 comprising 87.5% of the area. In contrast, the round dispenser 30 of the prior art shown in FIG. 2 has about 50% of the area covered by the side supports 34 and about 50% of the area is made up of the openings 36. The present dispenser 50 provides a significant increase in the size of the gap 74 which improves the efficiency of the air transfer between the cavity 68 and the exterior 76 of the frame 50. Articles within the cavity 68 can be heated, cooled, dried, etc. quicker with improved efficiency of the base 52. Tests have shown that the total temperature difference between the base and within the cavity has been reduced from 30° F. in prior art dispensers down to 10° F. due to this structure. The temperature reduction is especially significant when the article is a wax-containing article used to maintain the temperature of food at a desired level. These wax-containing articles can be required to be heated to a minimum temperature of 220° F. for proper use. However, with a prior art dispenser that only has a rating of 250° F. maximum, the dispenser can be damaged because the temperature to which the dispenser is exposed to heat the article in the cavity must be (220° F.+30° F.=) 250° F. This problem does not arise in the present dispenser 50 which is also the maximum rating of the dispenser.

This invention has been described in terms of specific embodiments set forth in detail. It should be understood, however, that these embodiments are presented by way of representation only, and that the invention is not necessarily limited thereto. Modifications and variations within the spirit and scope of the claims that follow will be readily apparent from this disclosure, as those skilled in the art will appreciate.

What is claimed is:

1. A self-leveling dispenser for discrete articles, said dispenser comprising;
    an elongate frame having a plurality of channel members spaced around a cavity for reception of a plurality of discrete articles;
    a plate extending less than fully around the cavity;
    a platform movable independently of the plate for supporting a plurality of discrete articles in the cavity; and
    first means cooperating between the frame, plate and platform for causing guided movement of the plate and platform lengthwise of the frame in a path selectively in first and second opposite directions,
    said first cooperating means including means for normally biasing the platform in one of the first and second opposite directions,
    wherein the biasing means comprises at least one extensible element acting between the plate and frame,
    wherein the frame includes a wall that resides between the one extensible element and the cavity,
    wherein the wall is part of one of the channel members that is a U-shaped channel member that opens away from the cavity, said extensible element nesting at least partially in the U-shaped channel member.

2. The self-leveling dispenser according to claim 1 wherein there is one and only one extensible element nested in the U-shaped channel member.

3. The self-leveling dispenser according to claim 2 wherein the extensible element has a width and the channel member has a width that is slightly greater than the width of the extensible element to thereby control deformation of the extensible element.

4. A self-leveling dispenser for discrete articles, said dispenser comprising:
    an elongate frame having a plurality of channel members spaced around a cavity for reception of a plurality of discrete articles;
    a platform for supporting a plurality of discrete articles; and
    first means cooperating between the platform and frame for guiding movement of the platform lengthwise of the frame in a path selectively in first and second opposite directions,
    said first cooperating means including at least one reversibly extensible element,
    one said channel member receiving at least a portion of only one said reversibly extensible element outside the cavity and controlling deformation of the one reversibly extensible element.

5. The self-leveling dispenser according to claim 4 wherein the one channel member defines a wall that resides between the one reversibly extensible element and the cavity.

6. The self-leveling dispenser according to claim 5 wherein the one channel member has a U-shaped cross-section with a base and spaced legs.

7. The self-leveling dispenser according to claim 6 wherein the one reversibly extensible element has a width and the spaced legs on the one channel member are spaced from each other a distance that is slightly greater than the width of the one reversibly extensible element.

8. The self-leveling dispenser according to claim 4 wherein the first cooperating means includes a flexible line acting between the frame and the platform.

9. A self-leveling dispenser for discrete articles, said dispenser comprising: an elongate frame having a plurality of channel members spaced around a cavity for reception of a plurality of discrete articles;
    a plate extending at least partially around the cavity;

a platform movable independently of the plate for supporting a plurality of discrete articles in the cavity; and first means cooperating between the frame, plate and platform for causing guided movement of the plate and platform lengthwise of the frame in a path selectively in first and second opposite directions, said first cooperating means including means for normally biasing the platform in one of the first and second opposite directions, wherein the biasing means comprises at least one extensible element, wherein the frame includes a wall that resides between the one extensible element and the cavity, wherein the wall is part of one of the channel members that is a U-shaped channel member that opens away from the cavity, said extensible element nesting at least partially in the U-shaped channel member.

10. The self-leveling dispenser according to claim 9 wherein the extensible element has a width and the channel member has a width that is slightly greater than the width of the extensible element to thereby control deformation of the extensible element.

* * * * *